US009801064B2

United States Patent
Kelts et al.

(10) Patent No.: US 9,801,064 B2
(45) Date of Patent: Oct. 24, 2017

(54) SYSTEM AND METHOD FOR USING A SYMBOL AS INSTRUCTION FOR A TARGET SYSTEM TO REQUEST IDENTITY INFORMATION AND AUTHENTICATION FROM A MOBILE IDENTITY

(71) Applicant: MorphoTrust USA, LLC, Billerica, MA (US)

(72) Inventors: A. David Kelts, Alington, MA (US); Timothy J. Brown, Billerica, MA (US)

(73) Assignee: MorphoTrust USA, LLC, Billerica, MA (US)

(*) Notice: Subject to any disclaimer, the term of this patent is extended or adjusted under 35 U.S.C. 154(b) by 0 days.

(21) Appl. No.: 15/280,211

(22) Filed: Sep. 29, 2016

(65) Prior Publication Data

US 2017/0094513 A1    Mar. 30, 2017

Related U.S. Application Data

(60) Provisional application No. 62/234,332, filed on Sep. 29, 2015, provisional application No. 62/273,813, filed on Dec. 31, 2015.

(51) Int. Cl.
*H04M 1/66* (2006.01)
*H04M 1/68* (2006.01)
(Continued)

(52) U.S. Cl.
CPC ............. *H04W 12/06* (2013.01); *H04L 67/02* (2013.01); *H04L 67/025* (2013.01); *H04L 67/04* (2013.01);
(Continued)

(58) Field of Classification Search
CPC ..... H04W 12/06; H04W 12/02; H04W 12/08; H04W 12/04; H04L 67/02
See application file for complete search history.

(56) References Cited

U.S. PATENT DOCUMENTS 5,815,574 A    9/1998    Fortinsky
8,973,108 B1   3/2015    Roth et al.
(Continued)

OTHER PUBLICATIONS

'QRStuff.com' [online] "QR Code Generator," 2015, [retrieved on Mar. 7, 2017]. Retrieved from the Internet: URL<http://www.qrstuff.com/index.html>. 2 pages.
(Continued)

*Primary Examiner* — Ajit Patel
(74) *Attorney, Agent, or Firm* — Fish & Richardson P.C.

(57) ABSTRACT

Some implementations may provide a method to have a user authenticated at a point of service. The method includes: accessing, by a target system, a multi-dimensional symbol rendered on a display of a mobile computing device of the user, the multi-dimensional symbol encoding endpoints and actions for the target system to perform in order to request and authenticate an identity of a user; decoding data in the multi-dimensional symbol to retrieve an identity token plus information about the authentication actions and the user's identity system; requesting the corresponding authentication actions of the user's identity system to include specific authentication measures for the user to perform as well as data for the user to release; and performing the authentication actions as requested and encoded in the multi-dimensional symbol such that the physical identity of the user of the mobile computing device is verified and the user consents to release the requested identity information at the point of service.

20 Claims, 7 Drawing Sheets

(51) Int. Cl.

| | | |
|---|---|---|
| *H04M 3/16* | (2006.01) | |
| *H04W 12/06* | (2009.01) | |
| *H04W 12/08* | (2009.01) | |
| *H04W 12/04* | (2009.01) | |
| *H04L 29/08* | (2006.01) | |
| *H04W 12/02* | (2009.01) | |
| *H04L 29/06* | (2006.01) | |

(52) U.S. Cl.
CPC .............. *H04L 67/10* (2013.01); *H04L 67/20* (2013.01); *H04L 67/42* (2013.01); *H04W 12/02* (2013.01); *H04W 12/04* (2013.01); *H04W 12/08* (2013.01)

(56) References Cited

U.S. PATENT DOCUMENTS

| | | | |
|---|---|---|---|
| 8,997,195 B1 | 3/2015 | Fadida | |
| 9,288,198 B2 | 3/2016 | Desoto | |
| 2009/0328178 A1* | 12/2009 | McDaniel | G06F 21/31 |
| | | | 726/9 |
| 2013/0064371 A1* | 3/2013 | Moses | G09C 5/00 |
| | | | 380/255 |
| 2013/0221084 A1 | 8/2013 | Doss et al. | |
| 2014/0020073 A1 | 1/2014 | Ronda et al. | |
| 2014/0096215 A1* | 4/2014 | Hessler | H04L 63/0869 |
| | | | 726/7 |
| 2014/0181911 A1* | 6/2014 | Kula | H04L 63/0853 |
| | | | 726/4 |
| 2015/0134552 A1* | 5/2015 | Engels | G06Q 30/0185 |
| | | | 705/318 |
| 2015/0324777 A1 | 11/2015 | Moshal | |
| 2016/0323108 A1* | 11/2016 | Bhogal | H04L 63/123 |
| 2017/0094514 A1 | 3/2017 | Kelts et al. | |

OTHER PUBLICATIONS

'self-issued.info' [online] "Json Web Token (JWT)" May 2015, [retrieved on Mar. 7, 2017]. Retrieved from the Internet: URL<http://self-issued.info/docs/draft-ietf-oauth-json-web-token.html>. 21 pages.

'tozny.corn' [online] "Making Crypto Easy for Developers and Users," 2016, [retrieved on Mar. 7, 2017]. Retrieved from the Internet URL<http://www.tozny.com>. 3 pages.

International Search Report and Written Opinion for International Application No. PCT/US16/54482, dated Dec. 15, 2016, 5 pages.

International Search Report and Written Opinion for International Application No. PCT/US16/54482, dated Dec. 15, 2016, 6 pages.

* cited by examiner

SYSTEM AND METHOD FOR USING A SYMBOL AS INSTRUCTION FOR A TARGET SYSTEM TO REQUEST IDENTITY INFORMATION AND AUTHENTICATION FROM A MOBILE IDENTITY

RELATED APPLICATIONS

This application claims the benefit of U.S. provisional patent application Ser. No. 62/234,332 filed Sep. 29, 2015 and U.S. provisional patent application Ser. No. 62/273,813 filed Dec. 31, 2015, the contents of both are incorporated by reference in their entirety for all purposes.

TECHNICAL FIELD

This document generally relates to identity management.

BACKGROUND

Identity management has become a perennial concern in the age of mobile computing when a consumer user may carry a mobile computing device through which a variety of on-line electronic transactions may be conducted. For example, transactions between a consumer and a provider may be subject to risks of identity theft, identity fraud, spoofing, phishing, etc., all of which may potentially hinder the flow of commerce. Consumer identities are distributed across various "accounts" that are difficult to manage and not always accessible at the point-of-sale or while mobile.

SUMMARY

Some implementations provide a method to have a user authenticated at a point of service and to release identity information, the method including: accessing, by a target system, a multi-dimensional symbol rendered on a display of a mobile computing device of the user, the multi-dimensional symbol encoding endpoints and actions for the target system to perform in order to request and authenticate an identity of a user; decoding data in the multi-dimensional symbol to retrieve an identity token plus information about the authentication actions and the user's identity system; requesting the corresponding authentication actions of the user's identity system to include specific authentication measures for the user to perform as well as data for the user to release; and performing the authentication actions as requested and encoded in the multi-dimensional symbol such that the physical identity of the user of the mobile computing device is verified and the user consents to release the requested identity information at the point of service.

Implementations may include one or more of the following features.

The target system may be a mobile computing device of another user or of a point of sale system. The multi-dimensional symbol may include a Quick Response (QR) code that uses JSON Web Token (JWT) to encode the authentication actions. The multi-dimensional symbol may encode an address information of the authentication server and an identity token for the user within that server. The multi-dimensional symbol may also encodes a key for accessing the authentication server or encoding the authentication request to be transmitted. The multi-dimensional symbol may be displayed on the screen of the mobile identity computing device of the user. The identity token for the user may be a one-time use token.

Accessing the multi-dimensional symbol may include scanning the multi-dimensional symbol using a scanning device at the point of service such that information is retrieved that encodes the user's credential information and a universal resource locator (URL) pointing to an authentication server.

Accessing the multi-dimensional symbol may include receiving the multi-dimensional symbol using a communication method at a point of service such that information is retrieved that encodes the user's credential information and a universal resource locator (URL) pointing to an authentication server.

Performing the authentication actions may include transmitting a first request to an authentication server at the URL address to have the user's identity verified based on the credential information. The method may further include adding risk-adjusted security level to the authentication and identity-data requests into the received identity token.

The credential information of the user may include a digital identity of the user and key information for accessing the authentication server. The user may have pre-registered at the authentication server to have the credential information of the user verified by third parties at points of service in order for the user to receive service at the points of service. The credential information of the user may have been vetted by a trusted government entity.

Performing the authentication actions may include executing a request through the authentication server on behalf of the user; receiving verification results from the authentication server that the user's identity has been verified; receiving identity data that the user consented to reply to the authentication request; and executing a transaction on the target system on behalf of the identified user in response to receiving the verified identity.

Executing the transaction may include: accessing the user's electronic account on behalf of the user. Executing the transaction may include storing the user's identity information in the target data system. Executing the transaction may include executing on the user's behalf or using the user's identity information a workflow or transaction in the target data system. Executing the transaction may include causing a physical facility to grant access to the user of the mobile computing device. Executing the transaction may be performed on a data server of the target system.

Some implementations may include one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

The age of mobile computing has ushered in endless possibilities of connectivity anywhere and anytime. Identity transactions can be performed through both desktop and mobile computing platforms, such as a smartphone, to engage various data servers, for example, in the cloud. In this context, the sheer volume and complexity of these on-line transactions may give rise to a digital world fraught with peril, including, for example, identity theft, identity fraud, spoofing, phishing, etc. For these transactions, identity management may become a consistent theme. As many systems and functionality move to mobile devices, consumer identity may as well. In that scenario, the mobile device carrying a consumer identity will need to field and fulfill identity requests on behalf of the consumer from all of the devices and systems used by the consumer or that the consumer interacts with or that others with whom the consumer does business interact with.

Some implementations as disclosed herein may provide systems and methods to power integrated identity management, in which the servers or engines act in concert with each other to verify the authenticity of an identity. For example, a symbol, such as a QR code, may be published on the screen of a browser device, physical world medium such as paper, or another medium. The published QR code may be scanned by a smartphone device. The symbol may contain instructions for the mobile device to establish or verify an identity at a server that may have issued the symbol in the first place or at a designated identity or authorization server. The mobile device may follow the instructions within the symbol by sending identification credentials in a digital form to an authentication server, which can return web tokens tailored to the mobile device for the application server to utilize. The returned web token may provide access control so that the controlling party of the application server can prescribe the parties authorized to access the resources of the controlling party as well as the scope of such authorized access. For example, the mobile device may send the returned access token, along with a requested resource, to the server, each time the mobile device requests a restricted resource. The link to the requested resource (such as a universal resource locator) may be included in the symbol read by the mobile device. The mobile device may then follow up the link, for example, by presenting the access token.

Additional implementations disclosed herein provide for the rendering of a symbol such as a QR code on the display of the mobile device from which a POS or target system can read and then execute the instructions in order to verify the identity of the user through an identity or authorization server. Policies at the identity or authorization server or encoded within the symbol can allow for authentication and consent of the user of the mobile identity.

Figure 1:
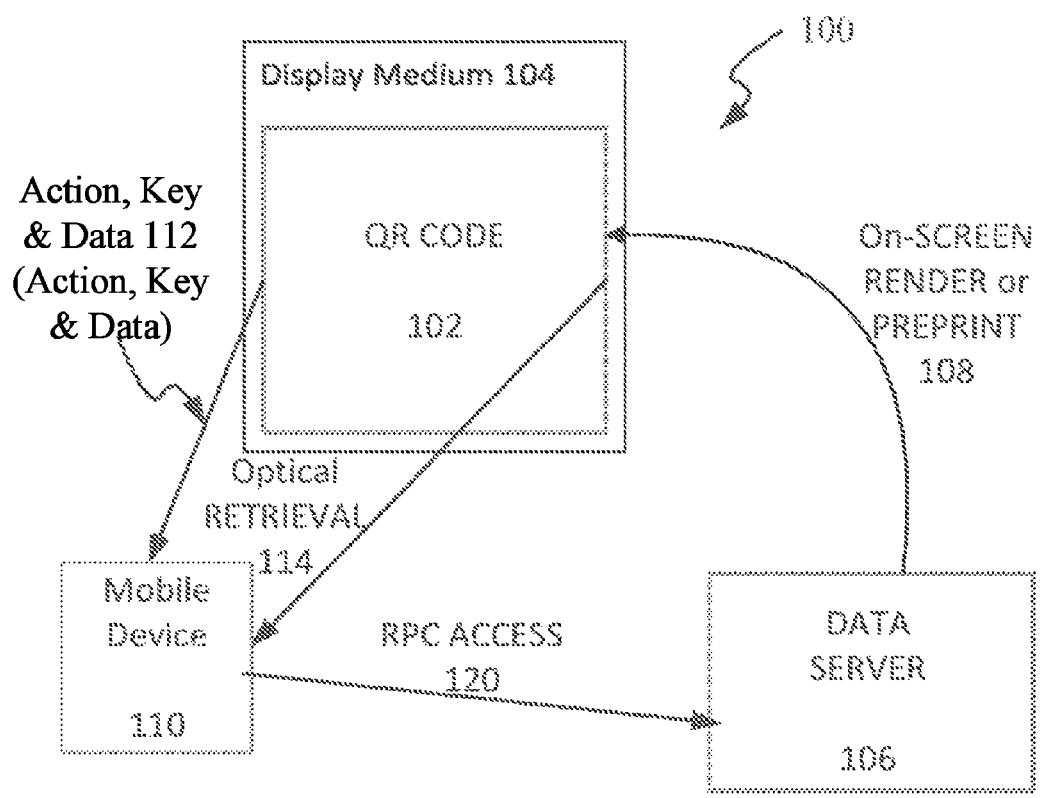
FIG. 1 is a diagram showing an example of securely and privately providing identity information to a target system from a mobile device by having the mobile device scanning an external symbol such as a QR code from a display medium such as a browser page on screen or any display or pre-printed material, the QR code which contains instructions and endpoints telling the mobile device precisely how to communicate to the target system.

FIG. 1 is a diagram showing an example 100 of accessing a data server 106 from a mobile device 110 by having the mobile device optically retrieving 114 an external symbol such as a QR code 102 from a pre-printed or screen-rendered or communicated via near field communication on Display Medium 104. The mobile device may then call Data Server 106 by using the Instruction 112 to perform a Remote Procedure Call (RPC) 120. Near-field communication (NFC) is a set of communication protocols that enable two electronic devices, one of which is usually a portable device such as a smartphone, to establish communication by bringing them within about 4 cm (2 in) of each other. Examples of near field communication implementations may include Bluetooth and WiFiDirect with NFC. In the example illustration 100, a symbol is published, for example, at a store front, on the side of a vehicle (such as a bus, a train, a taxi), in an electronic communication (such as an email, a text message, a posting at an on-line chat room, or other forms of inter-personal electronic social media communication), on a display medium of the target system that may include a browser window. The symbol may be published by a party hosting data or an API or a workflow engine on data server 106. In some examples, the symbol can include a Quick Response (QR) code 102. In these examples, the symbol may include a JSON Web Token (JWT) from the JSON Identity Suite that specify a link to data server 106 along with instruction 112 and the standard action for the Data Server to handle. Instruction 112 may also embed the symbol for the RPC 120. Instruction 112 may encode Action, Key, and Data specifying parameters and endpoint for performing the RPC 120. The Action resulting from the RPC is, for example, to log in, store information, start or continue a workflow on the target system, approve a transaction, start a transaction, etc.

In more details, mobile device 110 may include a smartphone. An example smartphone is a mobile phone with an advanced mobile operating system which combines features of a personal computer operating system with other features useful for mobile or handheld use. These smartphones typically combine the features of a cell phone with those of other popular mobile devices, such as personal digital assistant (PDA), media player and GPS navigation unit, and an image capture device. The image capture device may include a camera device, an infra-red imaging device, or other imaging device. The smartphone device may leverage on-board camera to optically retrieve (114) the QR code or symbol 102. In other instances, the smartphone device may utilize other sensors to take in JWT identity instructions and information in symbolic form 102. In one instance, the smartphone device can utilize a near-field communication to sense the Action, Key, and Data 112 information from a card (much like sensing the balance information from a metro card) or other electronic device. In another instance, the smartphone device may use an infrared camera or chromashifting algorithm to see such Action, Key, and Data 112 information from a symbol on a physical medium.

Data server 106 may include any computing device with a storage means. In particular, data server 106 may not be limited to a physical computer and may generally include data access points from the cloud.

Display Medium 104 may include preprinted physical media or on-screen display media such as on a touchscreen display showing QR code 102 within a browser window on the consumer user's mobile device 110. Display medium 104 may also broadcast or otherwise communicate the symbol.

The use of a full suite of identity instructions and information including a URL inside a symbol such as a QR code 102 in a standardized format (e.g., a JSON Identity Suite Web Token (JWT) 102) permits transmission of an endpoint and parameters from a website (e.g., referring to data server 106) in the form of, for example, Actions, Keys, and Data into a mobile device (e.g., mobile device 110) so that the mobile device can execute a function call in accordance with the specified Actions and Data. In some implementations, the mobile device 110 may utilize a key, as encoded in Instructions 112, to encrypt its own identity data to follow the Instructions 112 for the RPC 120. In one instance, this function call includes a remote procedure call (RPC) to access data server 106 at the endpoint or URL inside the symbol 102. In this instance, the URL can point to a stationary location. Once the user on mobile device 110 has accessed the URL at the stationary location, the user may be redirected to a location that is more dynamic, for example, a location that may reflect load balancing needs to serve requests from various regions, or from different time periods or authorization servers.

Figure 2A:
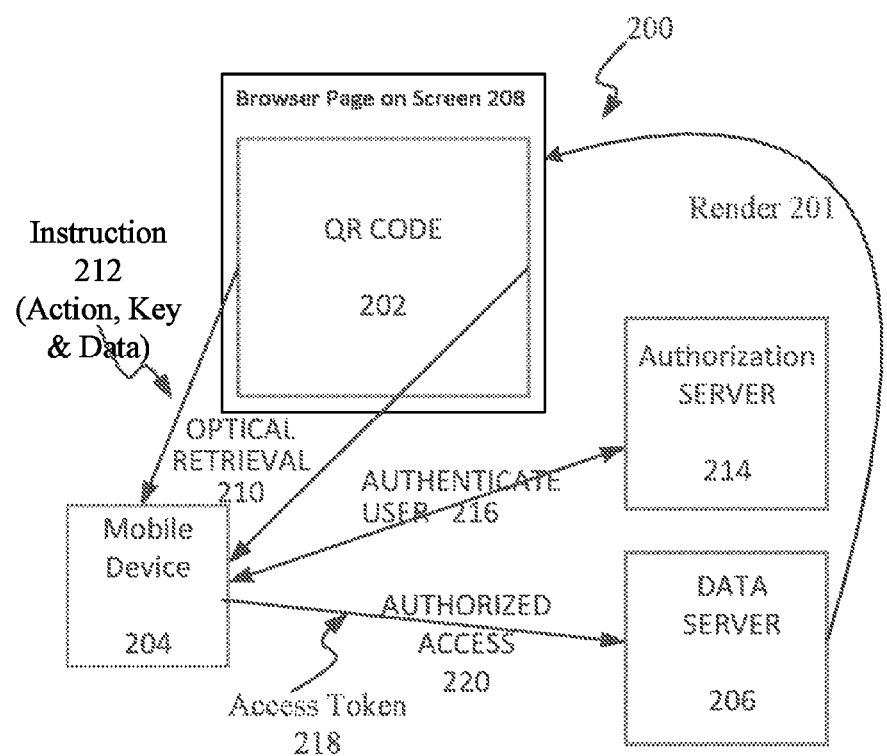
FIG. 2A is a diagram showing an example of logging in to a target system viewed through a browser page by having the mobile device scanning an external symbol such as a QR code from the browser page and gaining authorization directly from an authorization server that provides an access token which allows access to the target system data server.

Referring to FIG. 2A, a diagram 200 is illustrated in which a user can be granted access into a target system (such as data server 206) from a browser 208 displaying the QR code symbol 202. In this illustration, data server 206 renders (201) a symbolic code 202 on the screen of a browser page 208. Here, the symbolic code 202 encodes instruction 212. Instruction 212 in turn may encode action, key, and data, as discussed above. As illustrated, such information can be optically retrieved (210), for example, through an optical scanning operation. The retrieved information generally provides instructions telling the mobile device 204 how to obtain an access token 218 from an authorization server 214 so that mobile device 204 is granted authorization (220) to use functions or access data as available on the data server 206. The authorization server 214 can be a standards-based server, handling protocols such as OAuth, User Managed Access, SAML, etc. toward providing identity or API based authorization on behalf of the data server 206 for the identity represented by the mobile device 204.

Figure 2B:
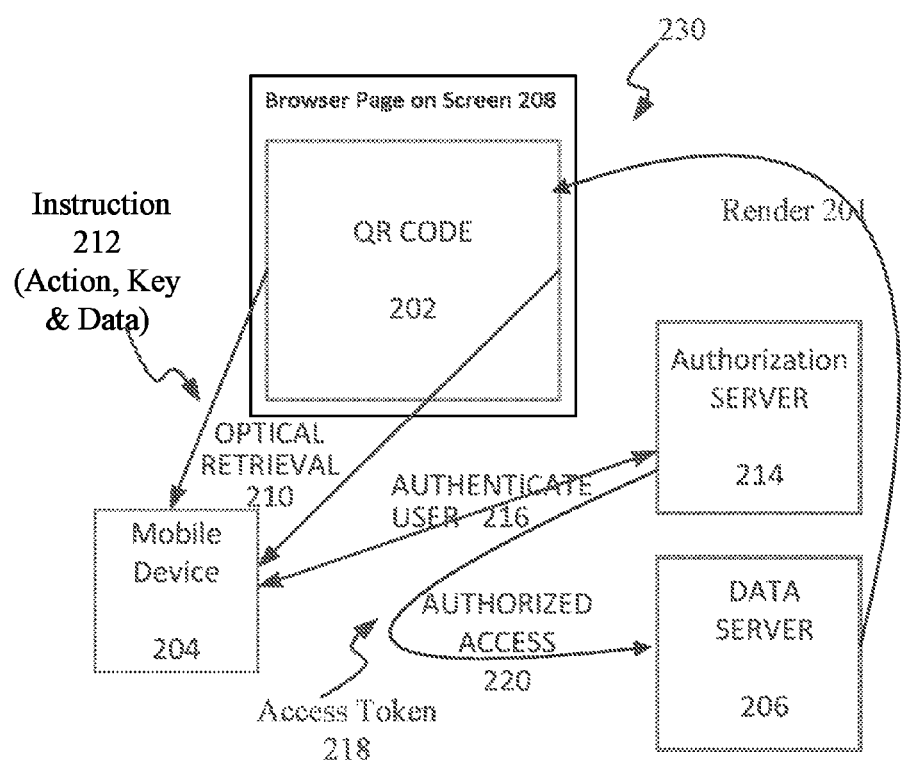
FIG. 2B is a diagram showing an example of logging in and providing identity information to a target system viewed through a browser page by having the mobile device scan an external symbol that contains identifiers to the target system that include directions to verify specific identity claims about the consumer using a pre-registered authorization server in order to grant access to the target system. The external symbol contains directions on how the authorization server should forward those claims and the identity directly to the target system, or as in FIG. 2A the mobile device can provide those claims to the target system.

FIG. 2B is a diagram 230 showing an example of a user being granted access to a target system 206 from a browser page 208 by providing an access token 218 to the target system after following instructions 212 to verify specific identity claims about the consumer with a pre-registered authorization server 214 and instructions to authenticate 216 the user themselves before having the authorization sever 214 forward the access token 218 directly 220 to the data server 206 thereby gaining access to the target system. Similar to the illustration of FIG. 2A, data server 206 renders (201) a symbolic code 202 on the screen of a browser page 208 such that the symbolic code 202 encodes instruction 212 that can include Action, Key, and Data. As illustrated, such information can be optically retrieved (210), for example, through an optical scanning operation or retrieved by alternate communications. The retrieved symbol generally provides instructions for the user of mobile device 204 to be authenticated at an authorization server 214 so that the user of mobile device 204 obtains authorized access (220) and is redirected to the data server 206 to access resources (such as functions and data) stored thereon.

In the illustrations for FIGS. 2A and 2B, JSON Identity Suite web token (JWT) can be implemented in the QR code. The general schematic for embedding a JWT in a QR code is such that the JWT represents secure instructions 212 for the mobile device 204. For example, the secure instructions can cause the mobile device 204 inquire of an Issuer Authorization Server (e.g., labeled as 'iss') to approve a claim/scope ('sub' or 'prn') at the requested level of trust (e.g., labeled as 'acr') and provide the resulting token (e.g., labeled as id_token) or code (response type 'typ') to the relying party's (RP's) specific endpoint (e.g., labeled as 'aud') at the data Server. The sender may also encrypt the token with a public key ('sub_jwk') of the recipient if such information is provided in the instructions 212.

The general schematic discussed above may provide for a comprehensive list of identity actions that a Relying Party (RP) may request from the issuer so that the identity of a user on a mobile device can be authenticated by leveraging the authorization server. These identity actions include:

Login—User uses their identity to log into a service at an RP by presenting an id_token that the RP has previously seen/registered;

Register—the identity creates a new "account" at a high level of trust at the RP site with minimal exchange of only required attributes from the 'scope';

Associate—the User associates their identity with an existing "account" at an RP site to which they have already authenticated;

Authenticate—the User proves that they are in still possession of their identity at the requested level of trust;

Consent—the User authenticates and provides consent to the RP's desired level of trust and their subject consent message;

Verify Me—Target System (e.g. POS) calls the User's OP/userinfo endpoint to obtain the claim the User presented in QR and, once claim processing starts, User will consent to; and Prove Yourself—User asks their own OP Authorization Server to prove the scope/claim that the RP wants to know (e.g. 'over21').

Apply—User exchanges identity information for access to some benefit or to fill out a form on a web page or a form at the data server.

Figure 3:
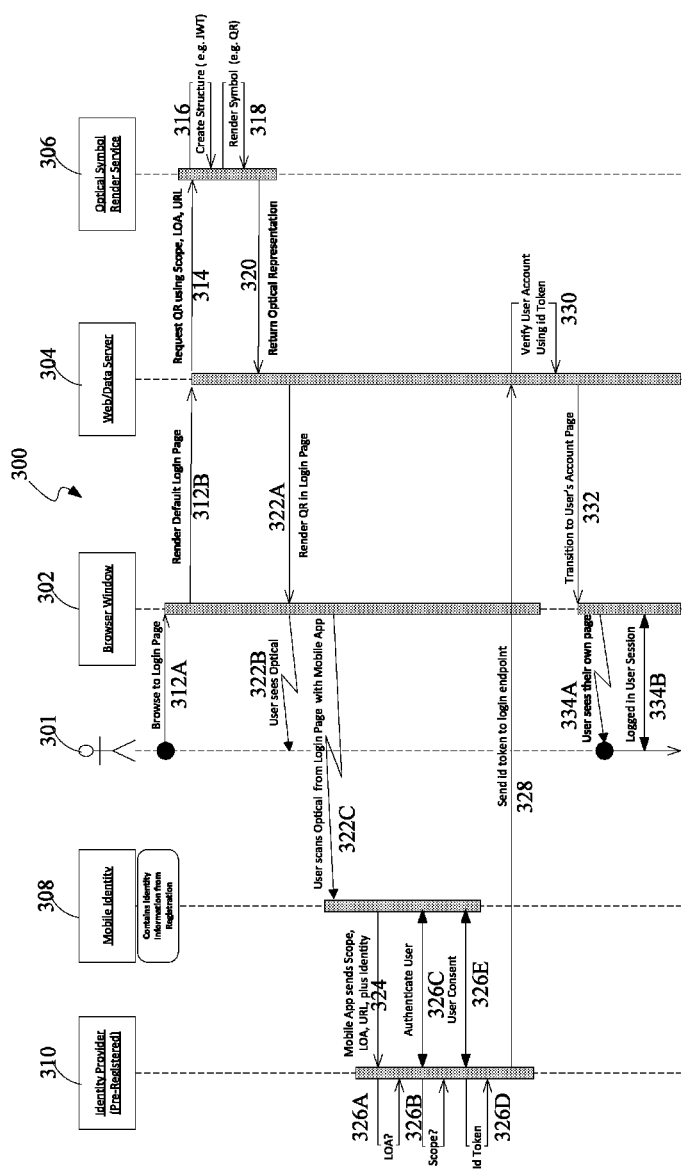
FIG. 3 is a diagram showing an example of password-less authentication approach from a PC browser at a server that authenticates a user for authorization. The mobile device authenticates the user and releases the "login" transaction on behalf of the browser window for the Identity Provider to send to the Data Server, instead of the user inputting their username and password.

Referring to FIG. 3, a sequence diagram 300 shows an example of password-less authentication approach from a PC browser at a server that authenticates a user for authorization. The mobile device authenticates the user and creates the "login" transaction on behalf of the browser window for the Identity Provider to send to the Data Server, instead of the user inputting their username and password.

Initially, user 301, at browser window 302, accesses a login page (312A). For example, user 301 may be greeted with an invitation to login to access an account on-line at browser window 302. The action may initiate a request to render the default login page (312B). Here, user 301 may not need to provide a username and password combination to be granted access. Instead, the user may be authenticated through a rendered default login page that contains, for example, a scannable symbol.

An initial request to render the default login page may arrive at Web/Data Server 304. For example, the initial request may be included in the payload data encapsulated in a POST request during a HTTP (HyperText Transfer Protocol) session between the login window on the browser window 302 and Web/Data Server 304. In response to the request, Web/Data Server 304 may request a scannable symbol (such as a QR code) from Optical Symbol Rendering Service 306 (314). The Optical Symbol Rendering Service 306 may be part of a SaaS (Software as a Service) offered by a third-party identity provider (for example, identity provider 310). As illustrated, the request may indicate the sought-after scope, level of assurance, and a Universal Resource Locator (URL) link. The desired scope may refer to the extent of the access right to be granted to the user. For example, the amount of data, the type of data, the location of data, accessible to the user 301 once the user completes the login transaction. In some implementations, the desired scope of rights may even include the dollar amount being authorized, the type of user-submitted transactions, the geographic locations from which the user may submit transaction requests. The desired level of assurance (LoA) may describe four levels of identity authentication assurance levels, with Level 1 being the lowest level of assurance and Level 4 being the highest level of assurance. Each assurance level describes the degree of confidence that the user who presented a login credential is in fact that user (i.e., who the presenter purports to be). The URL link may refer to the web address of, for example, identity provider 310. The web address represents the on-line address where the user's identity claim is subject to verification, as discussed in further detail below.

In response to the request for the desired scope, level of assurance, and Universal Resource Locator (URL) link, the Optical Symbol Rendering Service 306 may create a structure that specifies the desired scope, level of assurance, and Universal Resource Locator (URL) link (316). In some implementations, the structure is implemented in the form of JSON Identity Suite Web Token (JWT). Using the formed structure, the Optical Symbol Rendering Service 306 may then render a symbol, such as QR code (318). Optical Symbol Rendering Service 306 may then return an optical representation of the symbol to Web/Data Server 304 (320). The optical representation may refer to data encoding, for example, the created QR code.

Upon receipt, Web/Data Server 304 may render the created symbol (such as the QR code) in the Login page (322A). User 301 may visualize the symbol (322B). User 301 may then use a mobile app to scan the symbol being displayed at the Login page (322C) to complete the login transaction. In some cases, the user can scan the symbol using, for example, an image capture device of a mobile computing device of the user such that information from the symbol is optically retrieved. Here, the user 301 may be associated with a mobile identity 308, e.g., a digital identity on the user's mobile device (such as a smartphone device). The mobile identity may be carried around by user 301 and may be protected by security measures to prevent being tampered with. In particular, the user 301 may have registered mobile identity 308, for example, at identity provider 310.

To carry out the login transaction, the mobile device of the user may extract information encoding the scope, the LoA, and the URL from the scanned symbol. Subsequently, the mobile device may send data encoding the extracted scope and LoA as well as the identity credential information to the URL that corresponds to identity provider 310 (324). The identity credential information may include, for example, a digital identity of the user 301. In some implementations, the digital identity may correspond to a digital identification document that has been vetted, for example, through a process administered by a government agency such as the DMV or the state department.

Upon receipt of the data sent from the mobile device, the identity provider 310 (often times represented by a server computer) reviews the LoA to determine the desired level of assurance (326A). Depending on the determined LoA, the identity provider 310 then leverages the mobile identity to authenticate the user. In particular, the identity provider 310 may rely on the mobile identity (with varying degrees of rigor depending on the LoA) to verify that user 310 is authorized to act with the scope of requested right to access the account under management of Web/Data Server 304 (326B). For example, identity provider 310 may implement policies to triage users so that those meet the requisite conditions (e.g., over 21 to purchase alcohol from an on-line store). In some implementations, identity provider 310 may interact with mobile device to obtain user consent (326E) and then generation an ID token (326D). The ID token may be used to cause the user 310 to login to the user's account. In some implementations, the ID token may expire after a period of time since issuance. In some implementations, the ID token may encapsulate transactional characteristics that reflect the underlying transaction. For example, ID token may indicate the geographic location from which the login attempt is underway. The ID token may be transmitted to an endpoint, such as Web/Data server 304 (328). Based on the ID token, Web/Data server 304 may verify that user 301 can access the account on Web/Data server 304 and with the requested scope of rights. The determination may be based on the validity and authenticity of the ID token. In response to an affirmative determination, Web/Data server 304 may transition to user's account page (332). In some cases, the transition may lead to a new webpage to be displayed that correspond to the user's account page. In other cases, the transition may cause the user's account page to replace the login page in the browser window. In any event, the user 301 is now redirected to his/her account page so that the user 301 can the account page and start a user session at the account page.

In these implementations, identity data, purporting to support an identity claim, can be carried around by mobile device 204. Such identity data can be tied to, for example, a smartphone of the user. The identity data may be used, along with data retrieved from JWT objects encoding authentication actions to be taken by the mobile device 204. In one instance, the mobile device 204 may submit the identity claim at a data server, requesting access, as described in the encoded authentication actions from the JWT objects. In another instance, the mobile device 204 may submit the identity claim at an authentication server, which serves as a third-party identity server, for an access token. The mobile device 204 may then use the access token to access data at a data server. Thus, the identity data on mobile device 204 may become the bridge between the connected world and the mobile device.

Figure 4:
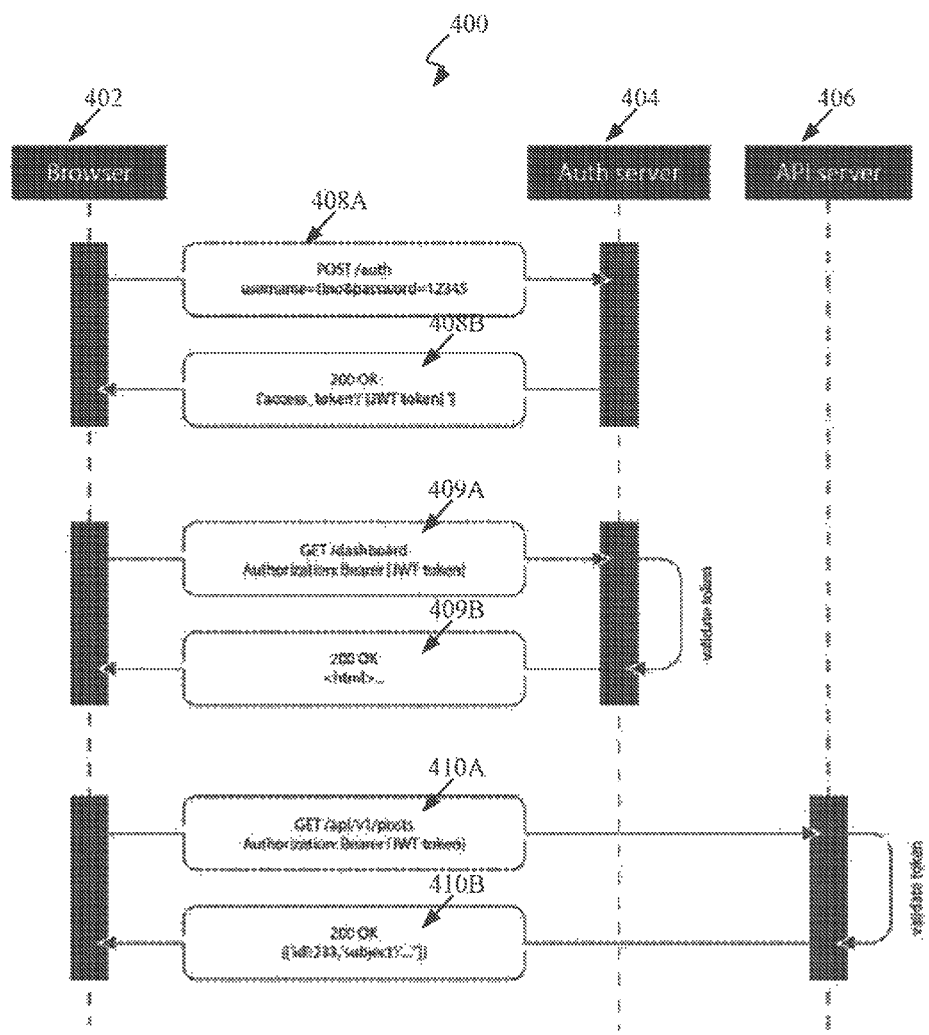
FIG. 4 is a diagram showing an example of token-based authentication from a mobile browser, through an authentication server, at an API server.

FIG. 4 is a diagram showing a diagram 400 of token-based authentication from a mobile browser 402, through an authentication server 404, at an API server 406. As illustrated, a browser or mobile client 402 makes a request 408A to the authentication server 404. Request 408A may be a POST/auth request that contains user login information such as username and password. The authentication server 404 may then generate a new JWT access token and encode the access token in a HTTP 200 OK response message 408B. The response message 408B may be returned to mobile browser 402. Subsequently, on every request to a restricted resource, the client sends the access token in the query string or authorization header. For example, mobile browser 402 may send HTTP/GET dashboard message 409A by encoding the earlier received JWT access token. In this example, authenticating server 404 then validates the access token and, if it's valid, generates a HTTP/200 OK response message 409B that includes the requested secure resource. Authenticating server 404 returns the secure resource to mobile browser 402. Thereafter, mobile browser 402 may request the secure resource at API server 406.

In this example, the authentication server 404 can sign the access token using a secure signature method. For example, a symmetric key algorithm such as Hash-based Message Authentication Code (HMAC) SHA-256 (Secure Hash Algorithm-256) can be used if there is a secure channel to share the secret key among all parties. In another example, an asymmetric, public-key system, such as RSA, can be used as well, eliminating the need for further key-sharing.

Token based authentication is stateless. Thus, there may be no need to store user information in the session. This storage convenience provides the ability to scale an application without regard to where the user has logged in. Various login locations can easily use the same token for fetching a secure resource from a domain other than the one the mobile browser has already logged in to.

Such authentication also emphasized reusability. In more detail, separate servers may be running on multiple platforms and domains. Reusing the same token for authenticating the user may become desirable. In this context, an application may be built that shares permissions with another application.

Such authentication may include security. By not using cookies, mobile browser 402 and authentication server 404 may not need to protect against cross-site request forgery (CSRF) attacks. As long as the access tokens are encrypted, for example, using tools such as JSON Web Encryption (JWE), sensitive information in an access token may be protected and such access tokens may be transmitted over, for example, secure hyper-text transport protocol (HTTPS) to prevent man-in-the-middle attacks.

Token-based authentication may also improve login performance. In this context, server side lookup may not be needed to find and deserialize the session on each request. The remaining task is simply to calculate the HMAC SHA-256 tag to validate the token and parse its content.

Figure 5A:
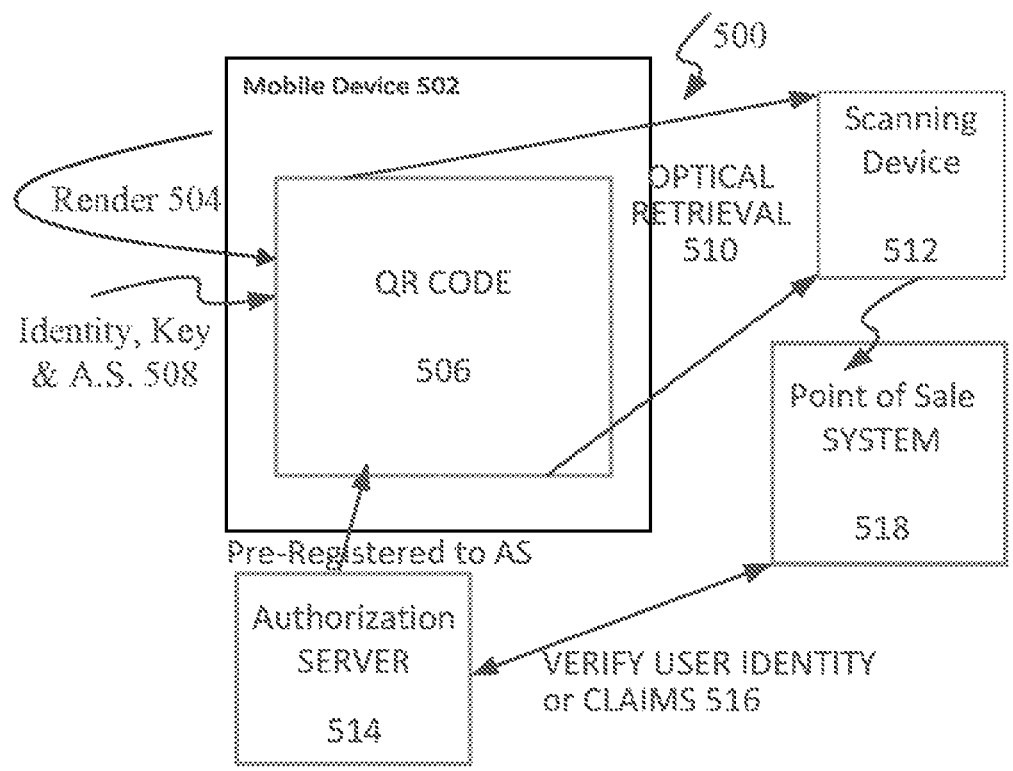
FIG. 5A is a diagram showing an example of authenticating a consumer user whose identity is on their mobile device by having a point of sale (POS) device scanning a QR code from the user's mobile device to cause the consumer user's digital identity to be verified at an identity/authorization server.
Figure 5B:
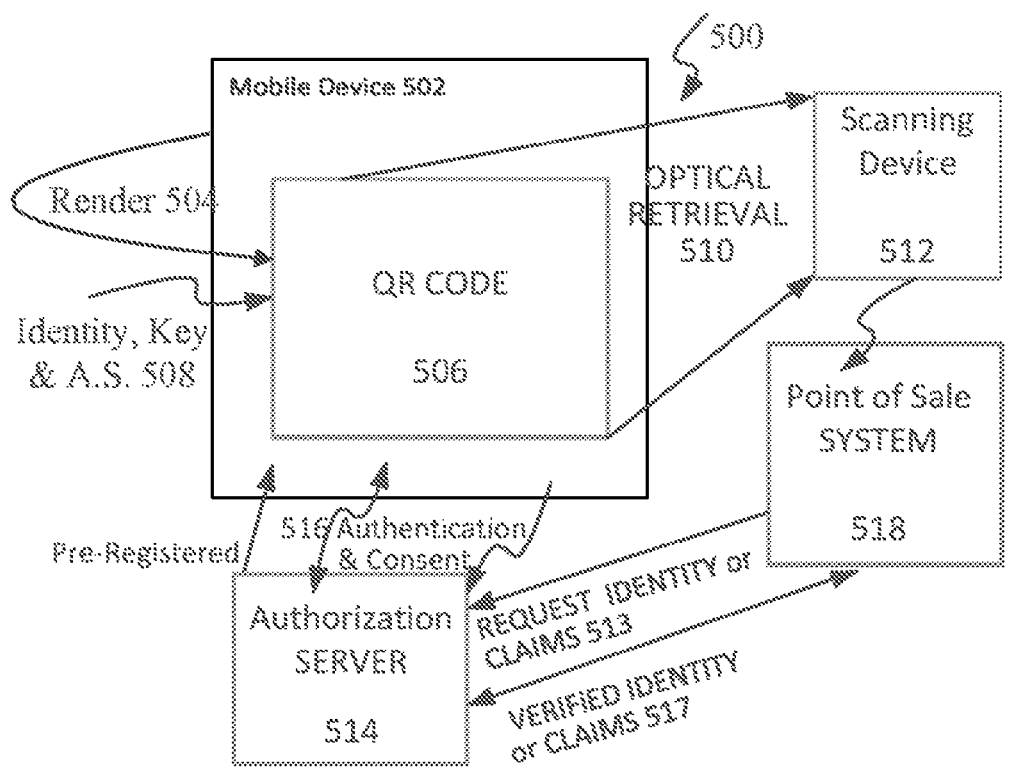
FIG. 5B is a diagram showing a variant of 5A an example of authenticating a consumer user by having a point of sale (POS) device scanning a QR code from the user's mobile device to cause the point of sale device to conduct a transaction through the identity/authorization server on behalf of the consumer user, with the consumer being asked to authenticate and consent to the transaction based on the POS system's required security level.

Referring to FIG. 5A-5B, a diagram 500 illustrates an example of a process functioning in the other direction from that of FIG. 1 and FIG. 2A-2B. In particular, the example illustrates identifying or authenticating a consumer user by having a point of sale (POS) device scanning a QR code on the user's mobile device to cause the consumer user's digital identity to be verified at an authorization server.

As illustrated in FIG. 5A, the mobile device 502 that is preregistered with an authorization server 514 renders (504) a symbol 506 (such as a QR code) that contains information 508 encoding the identity, keys, and a URL to the authorization server (AS) 514. A Point of Sale (PoS) system 518 can optically retrieve (510) the symbol 506, for example, by using an attached scanning device 512 such as an image capture device. The PoS system 508 can then utilize the identity, key, and URL pointer to authorization server (AS) 514 to verify identity or identity claims 516 from the mobile device 502. To support an identity or identity claims 516, a mobile device 502 can be validated by AS 514 that is chosen by the mobile device 502 and the PoS system 508 can verify the identity claim by reading the symbolic code 506 to determine how to verify the identity data by leveraging information 508 encoding the Identity, Key, and AS 514. One example of such activity is when the QR code contains a JWT that instructs the PoS system 508 on how to verify an age-based claim (such as Over-21) about the User of Mobile Device (the target identity), as explained above in the supported identity action of Prove-Yourself.

FIG. 5A illustrates an example of authenticating a consumer user by having the PoS system 508 scanning a QR code on the user's mobile device to cause the consumer user's digital identity to be verified at AS 514. FIG. 5B illustrates another example of authenticating a consumer user by having the PoS system 508 scanning a QR code on the user's mobile device so that the PoS system 508 can conduct a transaction through AS 514 on behalf of the consumer user. During pre-registration, user may entrust AS 514 to authenticate the user and consent to be bound by the authentication results from AS 514. PoS system 508 may submit a request for identity or claim 513 to AS 514 who has been entrusted to perform the authentication. PoS system 508 may further receive verified identity or claim 517 from AS 514.

Similarly, a cashier at a check-out stand at PoS may display a QR code comprising instructions for authenticating the user and authorization a transaction from the user's account. In one illustration, the merchant is preregistered at the authorization server 514. At check-out, when items from the shopping cart has been tallied, the cashier may display a symbol, such as a QR code that contains information 508 encoding the store identity, public key of the store, and a URL to the authorization server (AS) 514. The user, when checking out, may optically retrieve (510) the symbol 506 as displayed at check-out stand, for example, by using an image capture device such as a camera from the user's mobile device. The user's mobile device, as a browser device, can then utilize the store identity, public key, and URL pointer to authorization server (AS) 514 to get in touch with AS 514 to authenticate the user and then authorize a transaction. In this example, the QR code contains a JWT that instructs the mobile device of the user how to authenticate itself to AS 516 and then authorize a transaction to pay for the items in the shipping cart, as explained above in the supported identity action of Prove-Yourself.

Implementations of utilizing JWT in a QR code are not limited to the above described use cases. Indeed, various physical check-in mechanisms can incorporate the use of JWT in a QR code. For example, a school building may exhibit, at its gate, a QR code with instructions in JWT such that when the QR code is scanned by a smartphone device of a registered student in good standing, the gate may open to grant the student access to the school building. The QR code may be displayed on an electronic display and can be updated daily, or as needed. This gate keeper function can be seen in other cases requiring access control. For example, a hotel room may display, on its door, a QR code with instructions in JWT such that when the QR code is scanned by the guest who had checked in at front desk and had been assigned to this room, the door may open to allow the guest access. Similar use cases can be seen at gym facilities, club houses, apartment complexes, condo entrances, etc.

Various implementations of systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method to have a user authenticated at a point of service and to release identity information, the method comprising:
  accessing, by a target system, a multi-dimensional symbol rendered on a display of a mobile computing device of the user, the multi-dimensional symbol encoding endpoints and actions for the target system to perform in order to request and authenticate a physical identity of a user;
  decoding data in the multi-dimensional symbol to retrieve an identity token plus information about the authentication actions and the user's identity system;
  requesting the corresponding authentication actions of the user's identity system to include specific authentication measures for the user to perform as well as data for the user to release; and
  performing the authentication actions as requested and encoded in the multi-dimensional symbol such that the physical identity of the user of the mobile computing device is verified and the user consents to release the requested identity information at the point of service.

2. The method of claim 1, wherein the target system is a mobile computing device of another user or of a point of sale system.

3. The method of claim 1, wherein the multi-dimensional symbol includes a Quick Response (QR) code that uses JSON Web Token (JWT) to encode the authentication actions.

4. The method of claim 1, wherein the multi-dimensional symbol encodes an address information of the authentication server and an identity token for the user within that server.

5. The method of claim 1, wherein the multi-dimensional symbol also encodes a key for accessing the authentication server or encoding the authentication request to be transmitted.

6. The method of claim 1, wherein the multi-dimensional symbol is displayed on the screen of the mobile identity computing device of the user.

7. The method of claim 4, wherein the identity token for the user is a one-time use token.

8. The method of claim 1, wherein accessing the multi-dimensional symbol comprises:
scanning the multi-dimensional symbol using a scanning device at the point of service such that information is retrieved that encodes the user's credential information and a universal resource locator (URL) pointing to an authentication server.

9. The method of claim 1, wherein accessing the multi-dimensional symbol comprises:
receiving the multi-dimensional symbol using a communication method at a point of service such that information is retrieved that encodes the user's credential information and a universal resource locator (URL) pointing to an authentication server.

10. The method of claim 8, wherein performing the authentication actions comprises:
transmitting a first request to an authentication server at the URL address to have the user's identity verified based on the credential information.

11. The method of claim 10, further comprising: adding risk-adjusted security level to the authentication and identity-data requests into the received identity token.

12. The method of claim 4, wherein the credential information of the user includes a digital identity of the user and key information for accessing the authentication server.

13. The method of claim 12, wherein the user has pre-registered at the authentication server to have the credential information of the user verified by third parties at points of service in order for the user to receive service at the points of service.

14. The method of claim 12, wherein the credential information of the user has been vetted by a trusted government entity.

15. The method of claim 1, wherein performing the authentication actions comprises:
executing a request through the authentication server on behalf of the user;
receiving verification results from the authentication server that the user's identity has been verified;
receiving identity data that the user consented to reply to the authentication request; and
executing a transaction on the target system on behalf of the identified user in response to receiving the verified identity.

16. The method of claim 15, wherein executing the transaction comprises:
accessing the user's electronic account on behalf of the user.

17. The method of claim 15, wherein executing the transaction comprises:
storing the user's identity information in the target data system.

18. The method of claim 15, wherein executing the transaction comprises:
executing on the user's behalf or using the user's identity information a workflow or transaction in the target data system.

19. The method of claim 15, wherein executing the transaction comprises:
causing a physical facility to grant access to the user of the mobile computing device.

20. The method of claim 15, wherein executing the transaction is performed on a data server of the target system.

* * * * *